May 4, 1965 R. M. BELL 3,181,282
METHOD AND APPARATUS FOR HOLDING WORKPIECES
FOR A MATERIAL REMOVAL OPERATION
Filed April 5, 1962 3 Sheets-Sheet 1
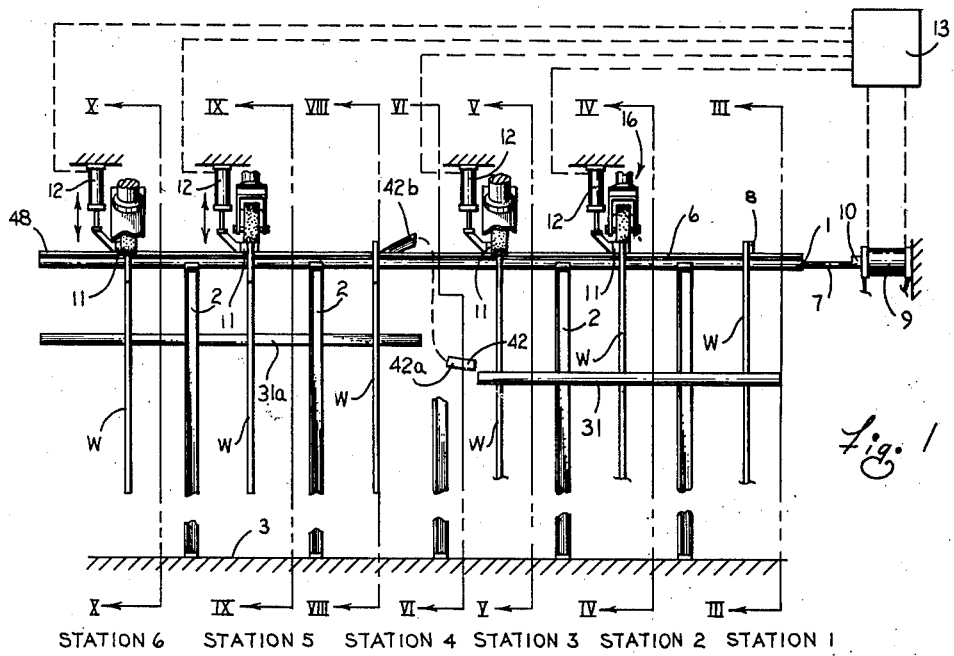
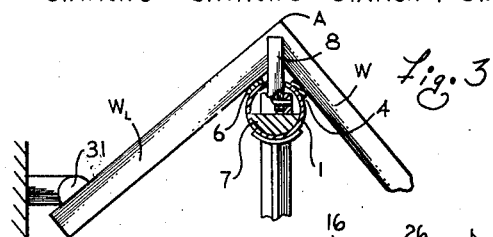
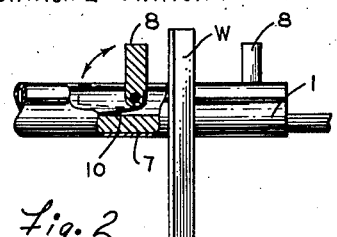
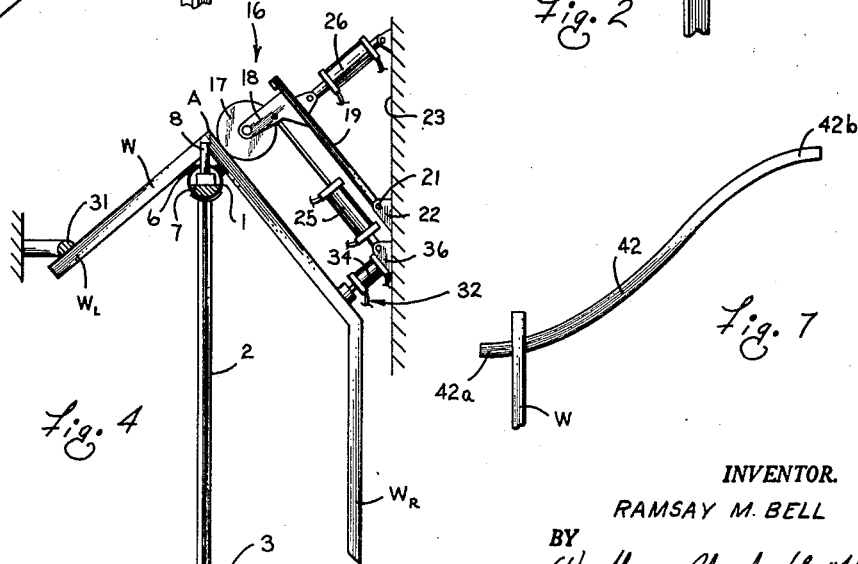
INVENTOR.
RAMSAY M. BELL
BY
Woodhams, Blanchard & Flynn
ATTORNEYS May 4, 1965

R. M. BELL 3,181,282

METHOD AND APPARATUS FOR HOLDING WORKPIECES
FOR A MATERIAL REMOVAL OPERATION

Filed April 5, 1962

INVENTOR.
RAMSAY M. BELL
BY
Woodhams, Blanchard and Flynn
ATTORNEYS

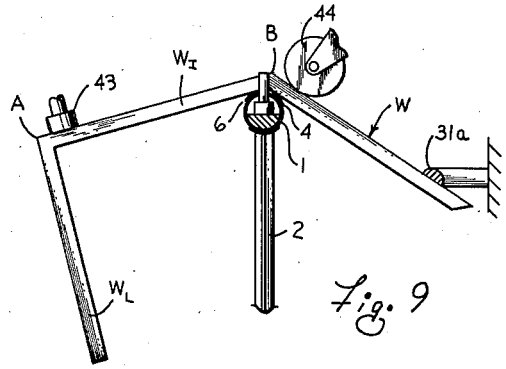
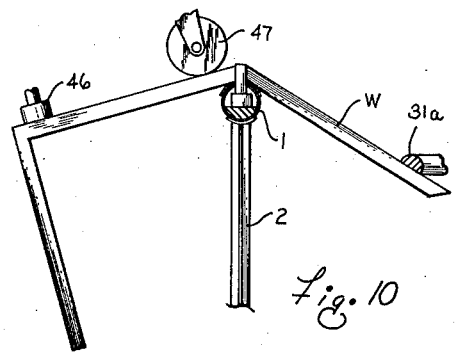
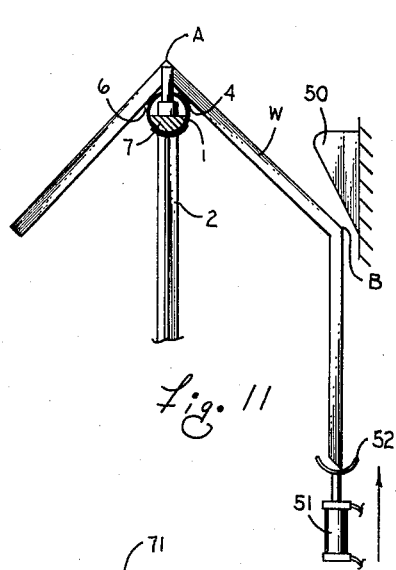
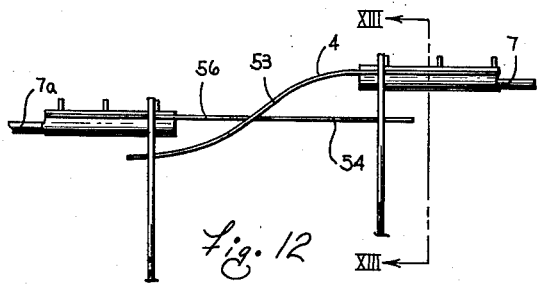
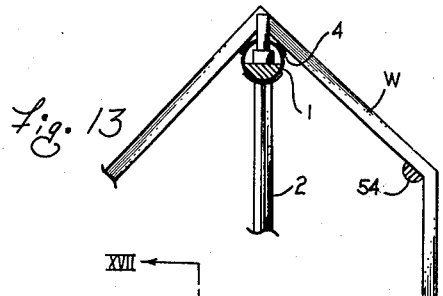
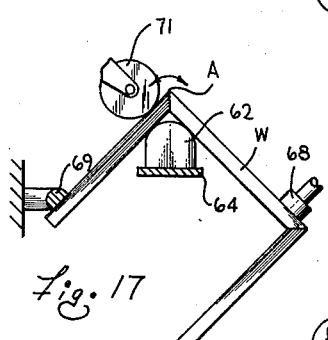
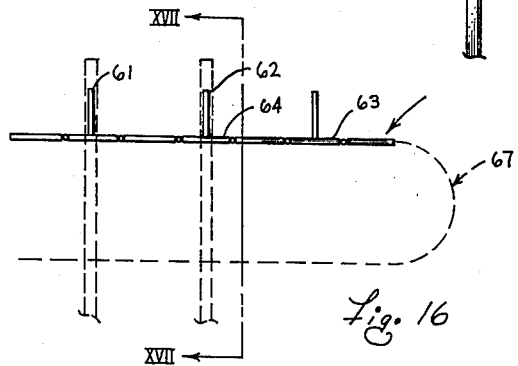
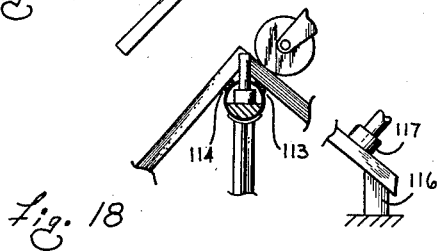
INVENTOR.
RAMSAY M. BELL

United States Patent Office 3,181,282
Patented May 4, 1965

3,181,282
METHOD AND APPARATUS FOR HOLDING WORKPIECES FOR A MATERIAL REMOVAL OPERATION
Ramsay M. Bell, Schoolcraft, Mich., assignor to Hammond Machinery Builders, Inc., Kalamazoo, Mich., a corporation of Michigan
Filed Apr. 5, 1962, Ser. No. 185,423
14 Claims. (Cl. 51—217)

This invention relates to a material-working method and machine and particularly to a type thereof for working, as abrading or buffing, the surface of irregularly shaped articles, usually metallic, without the need for holding same by an article-fitting fixture.

While the method and apparatus of the invention are applicable to a wide variety of material-working operations, usually metal-working and especially abrading or buffing operations and are applicable to many different types of workpieces, the invention was developed for the particular purpose of grinding the irregularities left by a welding operation on the corners of a metallic automotive window frame and, accordingly, it is most conveniently described with particular reference thereto. However, it should be clearly understood that the choice of such a workpiece for illustrating the invention is for illustrative purposes only and should in no sense be construed as limiting.

Turning now to the fabrication of automotive window frames for the purpose of illustrating the invention, it has long been the practice to weld the corners thereof together by any suitable form of welding, usually some form of electrical resistance welding. This leaves certain irregularities adjacent the weld zone and it is necessary to grind or buff off these irregularities, particularly on the outside corner of the frame, to improve the appearance thereof, to prepare same for painting or plating, or for other reasons.

In view of the high production involved in automotive fabrication, it is obviously desirable to carry out these grinding and buffing procedures by means which are as nearly automatic as possible. Further, the grinding and buffing art has long since been developed to a point where the design of suitable fixtures for holding such parts and presenting same to automatic grinding or buffing means is a relatively routine design problem. However, in the practical design of an automatic machine for carrying out such grinding or buffing, recognition must be made of the fact that there are a large number of different designs of window frames for a given make of automobile in any given year. Hence, considering convention practice which requires the solid gripping of the frame by a fixture especially designed for closely fitting the frame, it will be recognized that a very large number of fixtures would be needed for presenting various types of frames to the appropriate number of grinding or buffing devices. In view of the wide range of sizes and shapes of frames for different models of a given make of automobile in any one year, together with the changes in window sizes and shapes for any one model of such make of car from year to year, and bearing in mind further the number of fixtures required to carry an appropriate number of frames through an automatic machine at any given time, it becomes apparent that a prohibitive number of fixtures would be required to make an automatic machine operative for a wide enough range of frames and for a long enough period of time to justify its use. Therefore, in spite of the obvious savings in labor which could be obtained by an automatic machine, it has in the past been found more economical to carry out such grinding and/or buffing procedures by manual presention of the workpieces to suitable abrading devices and such has been the usual practice.

Accordingly, the objects of the invention include:

(1) To provide an abrading method and machine, particularly adaptable for the grinding or buffing of metallic workpieces, which will hold workpieces firmly and efficiently in position for the desired abrading thereof but which will not require the use of fixtures of the type which fit snugly against the workpieces to effect a solid gripping and supporting thereof.

(2) To provide a method and apparatus, as aforesaid, wherein the means for holding the workpiece can be readily accommodated to workpieces of a variety of shapes and sizes without appreciable change in the structure or design thereof.

(3) To provide a method and apparatus, as aforesaid, wherein the workpiece-holding means will be adaptable by only minor adjustments thereof to fit at least limited variations in the size or shape of a given class of workpieces and can further be modified by greater but still relatively minor changes for adapting said method and apparatus to very major changes in both the design and shape of the workpieces.

(4) To provide a method and apparatus, as aforesaid, which will be adaptable to a very wide variety of workpieces and to an equally great variety of sizes, styles and specific designs of a given type of workpiece, such as, for example, the welded corner of an automotive window frame.

(5) To provide apparatus, as aforesaid, which will be relatively simple to manufacture and to maintain in good operating condition for minimizing both the initial cost and the cost of maintenance of such apparatus.

(6) To provide apparatus, as aforesaid, wherein the successive stations can be spaced as desired from each other for further minimizing maintenance cost and thereby promoting both convenience and economy of operation.

(7) To provide apparatus, as aforesaid, which can be adapted for use with various kinds of abrading devices, as desired, such as grinding wheels, buffing wheels or abrasive-belt machines.

Other objects and purposes of the invention will be apparent to persons acquainted with methods and apparatus of this general type upon reading the following disclosure and inspecting the accompanying drawings.

In the drawings:

FIGURE 1 is a schematic side elevational view of an apparatus embodying the invention.

FIGURE 2 is a detail on an enlarged scale showing the method of advancing the workpieces.

FIGURE 3 is a section taken on the line III—III of FIGURE 1.

FIGURE 4 is a section taken on the line IV—IV of FIGURE 1.

FIGURE 7 is a section taken on the line VII—VII of FIGURE 6.

FIGURE 9 is a section taken on the line IX—IX of FIGURE 1.

FIGURE 10 is a section taken on the line X—X of FIGURE 1.

FIGURE 11 is a section similar to FIGURE 6 showing a modification.

FIGURE 12 is a fragmentary, schematic side elevational view of a modification.

FIGURE 13 is a section taken on the line XIII—XIII of FIGURE 12.

FIGURE 16 is a schematic side elevational view of yet another modification.

FIGURE 17 is a section taken on the line XVII—XVII of FIGURE 16.

FIGURE 18 is a view similar to FIGURE 6 showing still another modification.

*General description*

Figure 5:
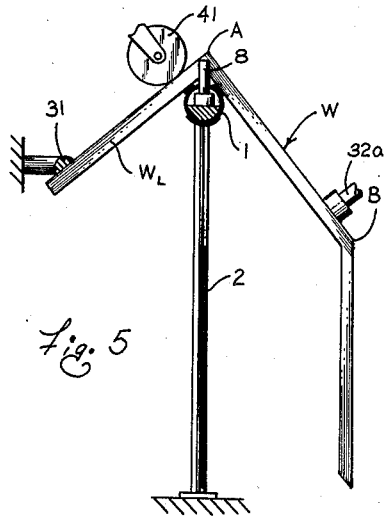
FIGURE 5 is a section taken on the line V—V of FIGURE 1.

In general, the invention contemplates providing an elongated, stepwise operating, conveying device for supporting and moving a plurality of workpieces in a stepwise manner successively to and through a plurality of work stations. An elongated abutment is, in one preferred embodiment of the invention, arranged along one side of the workpiece and a movable pad is positioned adjacent the opposite side of the workpiece adjacent each work station and is arranged to be urged thereagainst. Thus, when said movable pad is urged against the workpiece at the work station, the workpiece will pivot on the conveyor support therefor and bear against the elongated abutment. This in effect provides a three-point suspension for the workpiece and holds same fixed in position as desired for operation thereon by suitable metal-removing devices.

*Detailed description*

Turning now to the method and apparatus in more detail, reference will be made first to certain specific items of apparatus as a convenient and effective way of imparting a clear understanding of the method. It will be recognized, however, that the description of the method in terms of given apparatus for practicing same is employed solely as a matter of convenience and those skilled in the art will immediately recognize that there are several ways of practicing the method and that the specific items of apparatus herein set forth are only examples of same.

Referring now to the apparatus and workpieces schematically illustrated herein, it will be recognized that the workpiece W is an automotive door window frame of a commonly used type. In the apparatus illustrated a hollow beam 1 is supported on a plurality of suitable pedestals 2 which in turn are supported on a base 3, such as the floor of a work area. A pair of rub rails 4 and 6 are supported upon said beam 1 and extend the full length of the apparatus. A drive bar 7 is supported within the beam 1 and is provided at its upper edge with retractable lugs 8 which are adapted to engage and advance the workpieces W when the drive bar 7 moves in one direction and to fold down against a light spring 10 to pass the workpieces when the drive bar 7 moves in the opposite direction. Any convenient and known means may be provided for causing the drive bar 7 to advance the workpieces and there are many types of such apparatus. For example, the drive bar 7 may be connected to and for reciprocation by, a pressure fluid, as air cylinder 9 whose plunger 10 is caused by any convenient and known means (not shown) to reciprocate at the amplitude and rate desired.

A stop device 11 is located at each of the work stations as hereinafter described to locate the workpieces properly with respect to the abrading devices. Such stop may be held in position by any convenient means and be retracted therefrom as required by means such as an air cylinder 12 actuated in suitable timed relationship with the operation of the drive bar 7. The timing of the actuation cylinder 12 with respect to that of the drive bar 7 may be controlled by any convenient and known control apparatus, schematically indicated at 13.

At Station I the workpiece is merely placed by its corner A onto the rails 4 and 6 and is then advanced incrementally as desired to Station II by reciprocable operation of the drive bar 7.

At Station II there is provided an abrading device 16 which in this embodiment is indicated as being a grinding wheel 17 supported on a yoke 18 which in turn is slidably mounted on a bracket 19. Said bracket 19 is pivotally connected at 21 to a bracket 22 which in turn is mounted onto any convenient base or frame member 23. A reciprocable device 25, such as a pressure fluid cylinder, is also mounted on the base 23 and is connected to the yoke 18 for effecting slidable movement of said yoke on and along the bracket 19. A further reciprocable device 26, such as another pressure fluid cylinder, is likewise mounted on the base 23 and connected to the bracket 19 for moving the abrading device 16 toward and away from the workpiece W.

For holding the workpiece in position for receiving the abrading device 16, there is provided an elongated abutment 31 which is preferably adjustable as desired for a given installation and which is mounted adjacent but not necessarily in contact with the leftward arm $W_L$ of the workpiece W as same hangs in the position shown in FIGURE 3. Such position may be a gravity controlled position or, to insure clearance by the workpiece of the pedestals 2 and to minimize swinging of the workpiece W on the rails, the abutment 31 can normally be positioned to bear directly against the leftward arm of the workpiece for holding it in a desired position, such as the position shown in FIGURE 3.

As Station II, there is also provided a clamping device 32 likewise preferably adjustable as desired for a given installation, which engages the workpiece W, urges it pivotally around its corner A and causes the arm $W_L$ to bear firmly against the abutment 31. In this embodiment the clamping device 32 comprises a contact pad 33 which is mounted on a rod reciprocable within a pressure fluid cylinder 34, which cylinder is in turn mounted by a bracket 36 rigidly on the base 23. Energizing of the cylinder 34 causes the pad 33 to move downwardly and leftwardly as appearing in FIGURE 4 and thereby effects a clockwise pivoting of the workpiece around said corner A and causes its arm $W_L$ to engage the abutment 31. Thus, the workpiece W is clamped between the pad 33 and abutment 31 and is supported adjacent its corner by the rails 4 and 6 and said workpiece is thereby held solidly in position to receive the action thereon of the abrading device 16. When the abrasive action of the abrading device 16 is completed, the clamp 32 is released and the workpiece W again is advanced along the rails 4 and 6 to Station III. A similar clamp 32a (FIGURE 5) at this station effects a similar clamping of the workpiece so that same is held for action thereon by another abrading device 41.

Additional stations and abrading devices may be provided as desired for further working upon workpiece W in the region of corner A, or otherwise utilizing the position thereof with respect to the rails 4 and 6 as shown in FIGURES 4 and 5 to perform work thereon. Those stations, if any, will, however, be essentially the same as those shown in FIGURES 4 and 5 and will be understood without illustration thereof. Accordingly, no disclosure of same appears in the drawings.

Figure 6:
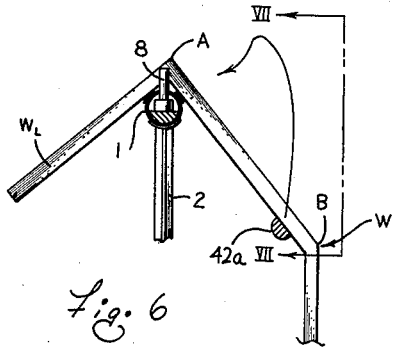
FIGURE 6 is a section taken on the line VI—VI of FIGURE 1.
Figure 8:
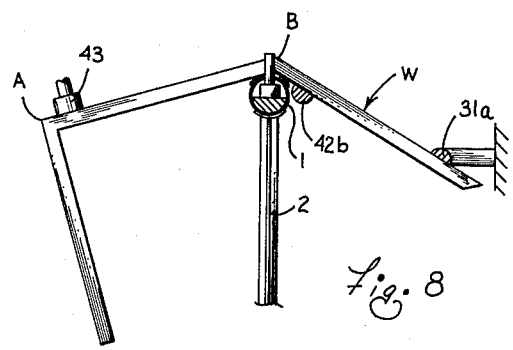
FIGURE 8 is a section taken on the line VIII—VIII of FIGURE 1.

Upon completion of work on the workpiece utilizing the position thereof wherein corner A is supported on the rails, means are provided for rotating the workpiece W in a counterclockwise direction (as seen in the drawings) and simultaneously sliding same leftwardly. Any of several well-known mechanisms may be provided for this purpose. For example, a cam rail 42 is shown in FIGURE 6 as engaging the lower surface of the workpiece W near the corner B thereof and FIGURE 7 shows that said cam rail 42 bends upwardly at 42a as same extends leftwardly (FIGURE 1) from said Station III so that at Station IV the upper end 42b of said cam rail 42 occupies the position shown in FIGURE 8 and the workpiece W has shifted also as shown in FIGURE 8.

As the workpiece enters the position shown in Station IV, it will be engaged by a suitable further abutment rail 31a and thereby be held from rotation too far in a counterclockwise direction. Preferably said rail may even swing the workpiece slightly in a clockwise direction to insure clearance of the pedestals 2 by the left-hand arm $W_L$ of said workpiece.

As soon as the workpiece is in the proper position with its corner B suitably positioned on the rails 4 and 6 of the beam 1 and seated against the stop 11 of Station V, if same is used, another clamp device 43 engages the intermediate portion $W_I$ of the workpiece W adjacent the corner A and rotates it, this time about the corner B thereof, to clamp it against the abutment 31a. An abrading device 44 is now brought into contact with a portion of the rail adjacent said corner B to be ground and the desired abrading action thereof is carried out. As soon as this abrading operation is completed the clamp 43 will then be released and the drive bar 7 actuated to advance the workpiece W to Station VI shown in FIGURE 10 wherein a further clamp 46 will again clamp the workpiece W against the abutment 31a and another abrasive device 47 will engage the workpiece adjacent the corner B for effecting further work thereon. Upon completion of such work, the clamp 46 is released and the workpiece forwarded in a similar manner to other work stations, if desired, located along the portion 48 of the supporting rail structure.

It will be recognized that a wide variety of specific devices may be provided for carrying out the process steps above outlined and the ones above set forth are only specific examples thereof. For example, the sidewise movement and counterclockwise rotation of the workpiece W which takes place between Stations III and IV may be carried out, as shown in FIGURE 11, by an air cylinder 51 whose plunger supports a hollow, hemispherically shaped device 52, said latter being positioned to engage the lower right-hand end of the workpiece W. The extension of the plunger of such cylinder 51 in an upward direction as indicated by the arrow in FIGURE 11 will move said workpiece W against a cam 50 which will rotate same counterclockwise sufficiently to move its corner B into position for being supported upon the rails 4 and 6 in a manner corresponding to the position shown in FIGURES 8, 9 and 10.

Similarly, as shown in FIGURES 12 and 13, instead of the rail provided at 42 for raising the right-hand arm $W_R$ of the workpiece W with respect to the left-hand arm thereof, the rails 4 and 6 may be curved downwardly as indicated at 53 (FIGURE 12) and a supporting rail 54 will engage the corner B and will extend horizontally as indicated at 55 above the lowermost point on rails 4 and 6. In such case the drive bar 7 will be terminated at the point where such downward bending of the rails 4 and 6 commences and a different but corresponding and similar drive bar 7a will be commenced in association with the rail 54 at the point where the rotation of the workpiece W has been completed. After said last-named point, corresponding to Station IV of FIGURE 1, suitable clamping and abrading means will be applied to the workpiece as above described.

A still further modification is indicated in FIGURES 16 and 17 where there is provided in place of the rails 4 and 6 a plurality of upstanding moving pedestals of which two are indicated at 61 and 62. Said pedestals are shaped to fit approximately into the inside corner of the workpiece W but the pedestal must still permit a pivoting of the corner A thereof around said pedestal in a manner indicated by the arrow in FIGURE 17. The several pedestals, of which 61 and 62 are only examples, are arranged on a plurality of plates, of which two are indicated at 63 and 64. Such plates are articulated together to provide an endless belt as generally indicated at 67 which is driven by any convenient means, not shown, to advance said conveyor in a stepwise manner from one station as above described to the next. The operations at each station are then carried out in the same manner as above described in that a clamp 68, corresponding to the clamps 32, 32a, etc., again causes the workpiece to bear against an abutment 69 corresponding to the abutment 31 for clamping the workpiece in position for suitable work thereon adjacent the corner A thereof by an abrading device 71 after which the part is shifted into a position corresponding to that shown in FIGURES 9 and 10 for further work thereon at the corner B.

Figure 14:
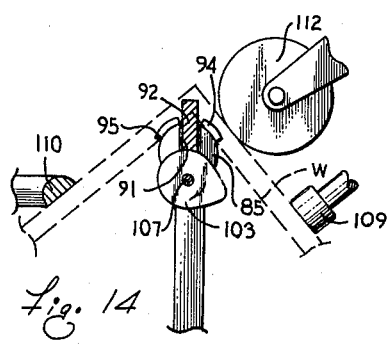
FIGURE 14 is a section taken on the line XIV—XIV of FIGURE 15.
Figure 15:
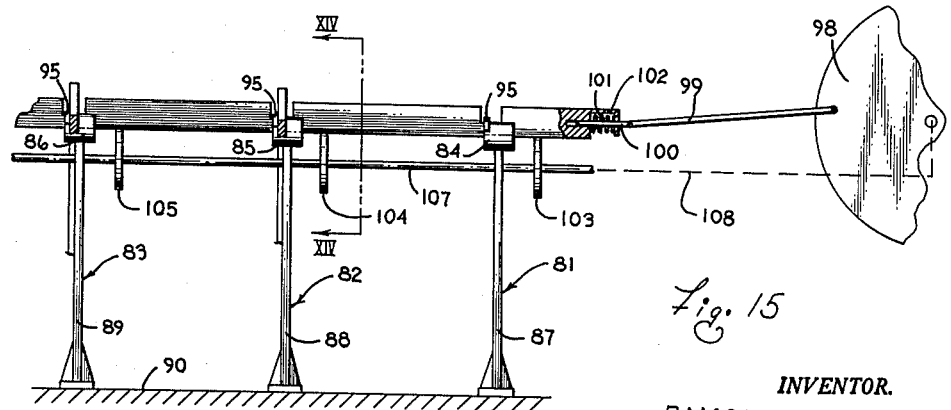
FIGURE 15 is a schematic side elevational view of another modification.

In all of the foregoing described devices the workpiece is indicated as being moved along relatively fixed rails. While this has certain advantages in obtaining a good support for the workpieces, other advantages, particularly ease of of installation and lower cost of equipment, may be obtained by providing a series of supporting stands, one thereof at each station and utilizing advancing means for both supporting and transferring workpieces from one station to the next. An example of such equipment is schematically indicated in FIGURES 14 and 15. In the apparatus shown in these figures there is shown only three stands 81, 82 and 83, each thereof respectively having work supports 84, 85 and 86 mounted on pedestals 87, 88 and 89 which are fixed to a suitable base structure 90.

Each of said supports has a slot 91 therein and an advancing bar 92 extends therethrough. Stops 94 and 95 are arranged on each of said work supports as shown. The advancing bar 92 is preferably provided along its upper edge with a plurality of serrations of any desired size and design, such serrations being indicated at 97.

Means are provided for causing said bar 92 both to move upwardly and downwardly and to reciprocate horizontally as desired. For example, to provide such reciprocation there is shown a drive wheel 98 operating a pitman 99 in any conventional manner, which pitman causes a rod 100 to reciprocate. Said rod is resiliently connected through a spring 101 to the drive bar 92 for effecting leftward movement thereof and through non-resiliently mounted hooks 102 for effecting rightward movement thereof. A plurality of cams, of which three are indicated at 103, 104 and 105, are mounted for simultaneous movement on a shaft 107 and are arranged under the drive bar 92 whereby rotation of said shaft 107 will effect upward and downward movement of said drive bar at a controlled rate and in a controlled relationship to the reciprocable movement imparted to said drive bar as above set forth. Preferably, the shaft 107 and the wheel 98 will be mechanically connected as indicated by the broken line at 108 for appropriately relating the vertical and horizontal movement of said drive bar.

In operation, workpieces will be fed to the machine by placing them successively on the supply support 84. Subsequent operation of the drive bar 92 will first lift a workpiece from said support 84, then move it leftwardly (as appearing in FIGURE 15) onto the support 85 and against the stops 94 and 95 thereon. The resilience of the spring 101 will prevent damage to the workpiece when same engages the stops 94 and 95 on support 85. The drive bar 92 will then move downwardly and a clamp 109 will be energized to clamp the workpiece against an abutment 110 in the same manner as above set forth in detail for operation thereupon by the desired abrading means, such as a buffing wheel 112. Upon completion of the abrading operation, the drive bar 92 will again be raised by the lift cams and will lift the workpiece W up and across the stops 94 and 95 and move same on leftwardly to the work support 86 where same will again be deposited against the stops 94 and 95 on said support 86 for being again clamped and receiving further abrading action.

If desired, the workpiece may be turned from one working position to another as it is moved between the supports in the same manner as above set forth in connection with other specific devices herein shown.

FIGURE 18 shows a still further embodiment in which only a single angle structure is being handled and wherein the fixed abutment 116 which corresponds to the abutment 31 in FIGURE 3, is placed on the same portion of said angle as that engaged by the clamp. The clamp 117, however, is positioned between the rails 113 and 114, corresponding to the rails 4 and 6, and the abutment 116. This will be particularly advantageous where only a single member is being handled or where one leg of an angular workpiece is too short to permit clamping or holding thereagainst. After the clamping has been accomplished, the abrading device is caused to operate on the workpiece as desired.

While certain embodiments of both the method steps and of apparatus for carrying out said steps are set forth herein for specific illustrative purposes, it will be recognized that same may be varied widely within the scope of the invention and that the specific examples thus given are for illustrative purposes only and are not limiting. Accordingly, the hereinafter appending claims should be interpreted to include such variations exceptions as said claims by their own terms expressly required otherwise.

What is claimed is:

1. In a process for holding a sharply bent, elongated, workpiece in position so that the workpiece can be operated upon, comprising the steps:

loosely supporting said workpiece at a support point substantially at the zone where it is bent so that the portions of the workpiece on either side of said zone extend downwardly below said support point and are maintained in such position by gravity but are free to swing about said support point;

applying a clamp force to a first point on said workpiece spaced from said zone and resisting said force at a second point spaced from said zone whereby said workpiece is rigidly supported at three points when said clamp force is effective and is free to be moved from one work station to another when said clamp force is ineffective.

2. In a process for holding a sharply bent, elongated, workpiece in position so that the workpiece can be operated upon, comprising the steps:

loosely supporting said workpiece at a support point substantially at the zone where it is bent so that the portions of the workpiece on either side of said zone extend downward below said support point and are maintained in such position by gravity but are free to swing about said support point;

applying a clamp force to a first point on said workpiece spaced from said zone and resisting said force at a second point spaced from and on the opposite side of said zone with respect to said first point, whereby said workpiece is rigidly supported at three points when said clamp force is effective and is free to be moved from one work station to another when said clamp force is ineffective.

3. In a method for abrading selected portions of an elongated workpiece having at least first and second bend points at which same is sharp bent, and wherein abrading is required adjacent each of said points, the steps comprising:

loosely supporting said workpiece at a first support point adjacent to said first bend point so that portions of the workpiece on either side of said first bend point extend downwardly below said first support point and are maintained in such position by gravity but are free to rotate about said first support point;

applying a clamp force to said workpiece at a first pressure point spaced from said first support point, said clamp force tending to rotate said workpiece in one direction about said first support point;

resisting said rotation at a second pressure point spaced from said first support point and on the opposite side thereof with respect to said first pressure point;

carrying out a first abrading operation;

subsequently moving said workpiece to a poistion where said workpiece is supported adjacent to said second bend point in the same fashion that it was supported at said first bend point and again applying a clamp force for urging rotation of said workpiece about a second support point and resisting said rotation at a point spaced from said second support point, and thereupon carrying out a second abrading operation in the region of said second bend point.

4. The method defined in claim 2 wherein an abrading operation is carried out after said clamp force becomes effective and wherein said clamp force is released after said abrading operation is completed and said workpiece caused to move from one work station to another work station, whereupon another clamp force and another resisting force is again applied and said workpiece clamped at said second work station so that further work can be performed thereon.

5. Apparatus for performing a material-removing operation on an angularly-shaped workpiece, comprising in combination:

support means for loosely engaging said workpiece adjacent an angle portion thereof, portions of said workpiece on either side of said angle portion extending downwardly to a point below said support means whereby said workpiece will hang on said support means stably although loosely in response to gravity;

clamp means for applying a clamp force to one part of said workpiece at a point spaced thereon from the point of support thereof by said support means;

abutment means resisting rotative movement of said workpiece induced therein by said clamp means, whereby said workpiece is clamped at three points thereon; and material removal means engageable with said workpiece.

6. The apparatus defined in claim 5 including conveying means for supporting and moving a workpiece stepwise from one work station to another and including support means at each of said stations, clamp means at each of said stations for applying a clamp force to said workpiece, abutment means at each of said stations for resisting said clamp force, and material removing means at said stations.

7. The apparatus defined in claim 6 wherein said abutment means is comprised of a rail extending through said stations and positioned to limit rotative movement of said workpiece around said support means in any position of said workpiece thereon.

8. Apparatus for performing metal-removing work at a plurality of work stations on an elongated workpiece having first and second spaced angular portions therein, comprising in combination:

support means for loosely engaging and supporting said workpiece adjacent one of said angular portions so that said workpiece is suspended and hangs downwardly therefrom and is free to rotate therearound and means for effecting stepwise movement of said workpiece from one work station to another so that the workpiece can be moved between work stations;

force-applying means spaced from said support means and effective at each of said work stations for engaging said workpiece at a point spaced sidewardly from said support means for urging said workpiece in a rotative direction around said support means, resisting means likewise positioned at each of said stations for engaging said workpiece at another point spaced from said support means and resisting said rotative movement whereby said workpiece may be clamped in each of said work stations so that work can be performed thereon;

position-shifting means between two successive ones of said work stations for imposing both a translative and rotative movement onto said workpiece by which it is moved from being supported at one angular portion thereof to another angular portion thereof, but remains subject to engagement by a force-applying means and a resisting means, whereby said workpiece may again be clamped adjacent said second angular portion so that further work can be performed thereon; and material removing means at said work stations and engageable with said workpiece for performing work thereon.

9. The apparatus defined in claim 8 wherein said position-shifting means is a cam rail engageable with said workpiece adjacent said second angular portion thereof for lifting same sufficiently that said workpiece will move by gravity from its first position to its second position.

10. The apparatus defined in claim 8 wherein said position-shifting means is comprised of fluid-actuated means engaging a portion of said workpiece for pushing same in a direction for effecting both rotation and translation thereof, whereby to shift said workpiece with respect to said support means from a position wherein said workpiece has its first angular portion substantially over and supported by said support means to a position in which its second angular portion is substantially over and supported by said support means.

11. The apparatus defined in claim 8 wherein said support means is comprised of a continuous rail and including advancing means for intermittently engaging said workpiece and advancing same lengthwise along said rail.

12. The apparatus defined in claim 8 wherein said support means is comprised of a plurality of individual pedestals separately supporting successive workpieces and stepwise movable conveyor means supporting said pedestals.

13. The apparatus defined in claim 8 wherein said support means is comprised of a plurality of discontinuous support devices and including also a single advancing means extending past a plurality of said discontinuous support devices, and synchronized means for effecting both vertical and horizontal reciprocation of said advancing means whereby said workpieces are moved from one support device to another.

14. In a means for holding a workpiece in position so that work can be performed thereon and moving it successively from one work station to another, comprising in combination:

conveyor means arranged for moving said workpiece from one work station to another;

supporting means operatively related to said conveyor means and arranged for loosely and swingably supporting said workpiece in a selectable position with respect thereto while being movable on said conveyor means;

first pressure imposing means for selectably urging said workpiece in one direction with respect to said supporting means and second pressure imposing means urging said workpiece in the opposite direction with respect to said supporting means, both said pressure imposing means being arranged to fix said workpiece rigidly with respect to said supporting means when said workpiece is at said work stations and to release said workpiece when it is to be moved from one work station to another.

References Cited by the Examiner
UNITED STATES PATENTS

| | | | |
|---|---|---|---|
| 139,148 | 5/73 | Harvey | 144—267 |
| 2,193,840 | 3/40 | Oberhoffken et al. | |
| 2,932,926 | 4/60 | Dreiling | 317—11 |

LESTER M. SWINGLE, *Primary Examiner.*

FRANK H. BRONAUGH, *Examiner.*